(12) United States Patent
Corliss, Jr.

(10) Patent No.: US 6,502,893 B1
(45) Date of Patent: Jan. 7, 2003

(54) EXTENDABLE DECK ASSEMBLY

(76) Inventor: Lawrence M. Corliss, Jr., 2 Cornwall St., Exeter, NH (US) 03833

( * ) Notice: Subject to any disclaimer, the term of this patent is extended or adjusted under 35 U.S.C. 154(b) by 0 days.

(21) Appl. No.: 10/071,467

(22) Filed: Feb. 8, 2002

(51) Int. Cl.⁷ .............................................. B60R 3/37
(52) U.S. Cl. .................................... 296/162; 296/26.13
(58) Field of Search .............................. 296/162, 26.13; 52/79.6

(56) References Cited

U.S. PATENT DOCUMENTS

| | | | |
|---|---|---|---|
| D191,161 S | 8/1961 | Bigelow | |
| 4,416,855 A | * 11/1983 | Flanagan | 296/162 |
| 4,969,030 A | 9/1989 | Clark | |
| 4,883,306 A | 11/1989 | Stucky | |
| 5,193,878 A | 3/1993 | Weaver | |
| 5,899,518 A | 5/1999 | Schreiner | |
| 5,997,073 A | 12/1999 | Vanderhoof | |

* cited by examiner

*Primary Examiner*—Joseph D. Pape

(57) ABSTRACT

An extendable deck assembly for providing a retractable deck for owners of recreational vehicles. The extendable deck assembly includes a frame adapted for coupling to an underside of the trailer. A first panel assembly is slidably coupled to the frame. A second panel assembly is slidably coupled to the first panel assembly. The first panel assembly slides outwardly from the trailer in a first direction and the second panel assembly slides outwardly from the first panel assembly in a second direction orthogonal to the first direction whereby the first and second panel assemblies form a deck extending along a side of the trailer.

11 Claims, 4 Drawing Sheets

EXTENDABLE DECK ASSEMBLY

BACKGROUND OF THE INVENTION

1. Field of the Invention

The present invention relates to extendable deck assemblies and more particularly pertains to a new extendable deck assembly for providing a retractable deck for owners of recreational vehicles.

2. Description of the Prior Art

The use of extendable deck assemblies is known in the prior art. U.S. Pat. No. 5,997,073 describes a system for providing a retractable deck for recreational vehicles. Another type of extendable deck assemblies is U.S. Pat. No. 5,899,518 having a decking system and decking assembly method for recreational vehicles.

While these devices fulfill their respective, particular objectives and requirements, the need remains for a device that the offset in the track that permits the top surface of the second panel to be positioned coplanar to the top surface of the first panel even though the second panel is stored within the first panel. The cover panel or plate that pivots to cover a gap between the first and second panels when the second panel is fully extended includes a deck that provides additional living space.

SUMMARY OF THE INVENTION

The present invention meets the needs presented above by providing a user with a deck system that can easily be adjusted to provide various sizes.

Still yet another object of the present invention is to provide a new extendable deck assembly that would provide camper owners with increased cleanliness, added living space, and ease of use.

Even still another object of the present invention is to provide a new extendable deck assembly that would provide added comfort to users when camping, without being pestered by small animals or insects on the ground.

To this end, the present invention generally comprises a frame adapted for coupling to an underside of the trailer. A first panel assembly is slidably coupled to the frame. A second panel assembly is slidably coupled to the first panel assembly. The first panel assembly slides outwardly from the trailer in a first direction and the second panel assembly slides outwardly from the first panel assembly in a second direction orthogonal to the first direction whereby the first and second panel assemblies form a deck extending along a side of the trailer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
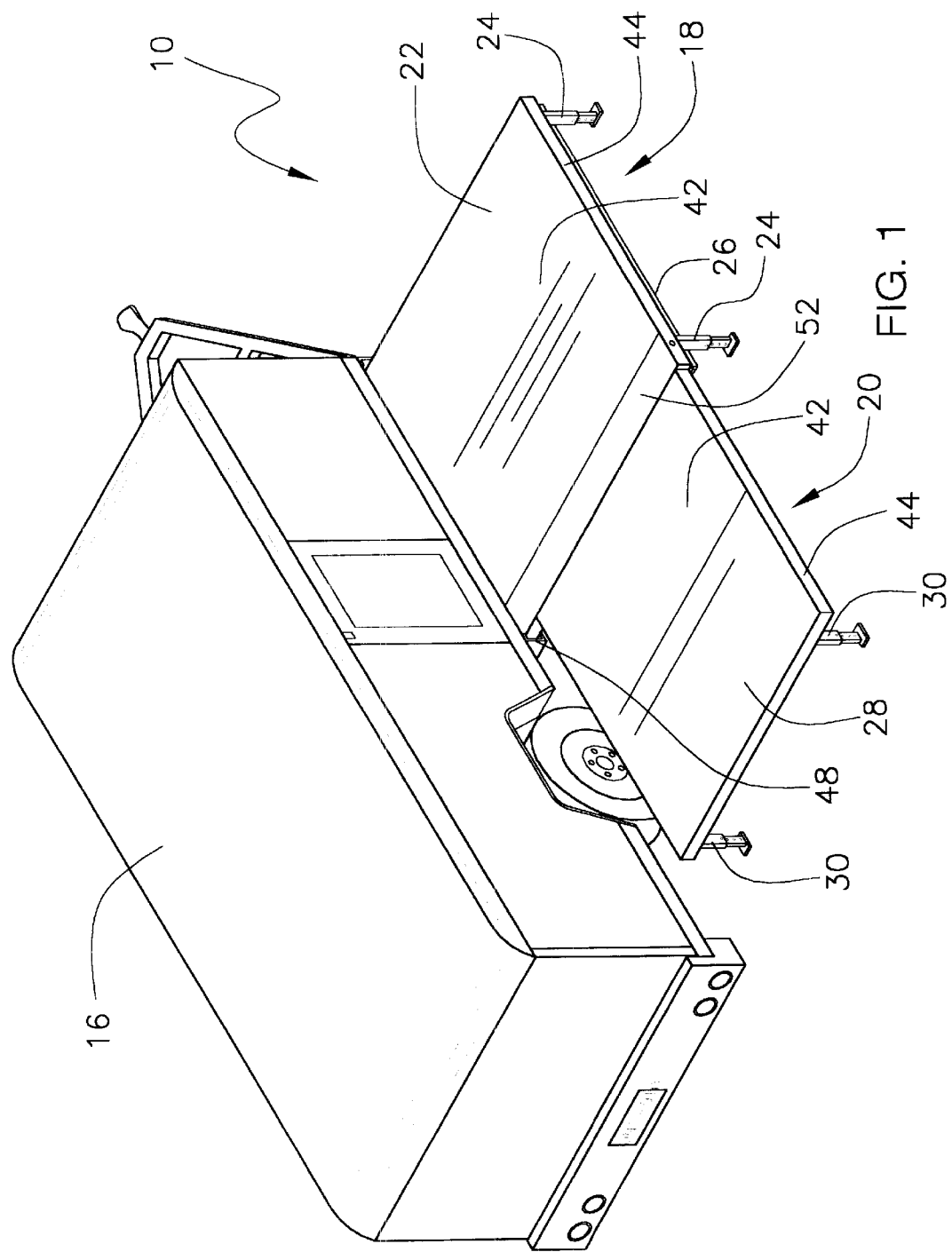
FIG. 1 is a perspective view of a new extendable deck assembly according to the present invention with the second panel in an almost fully extended position.
Figure 2:
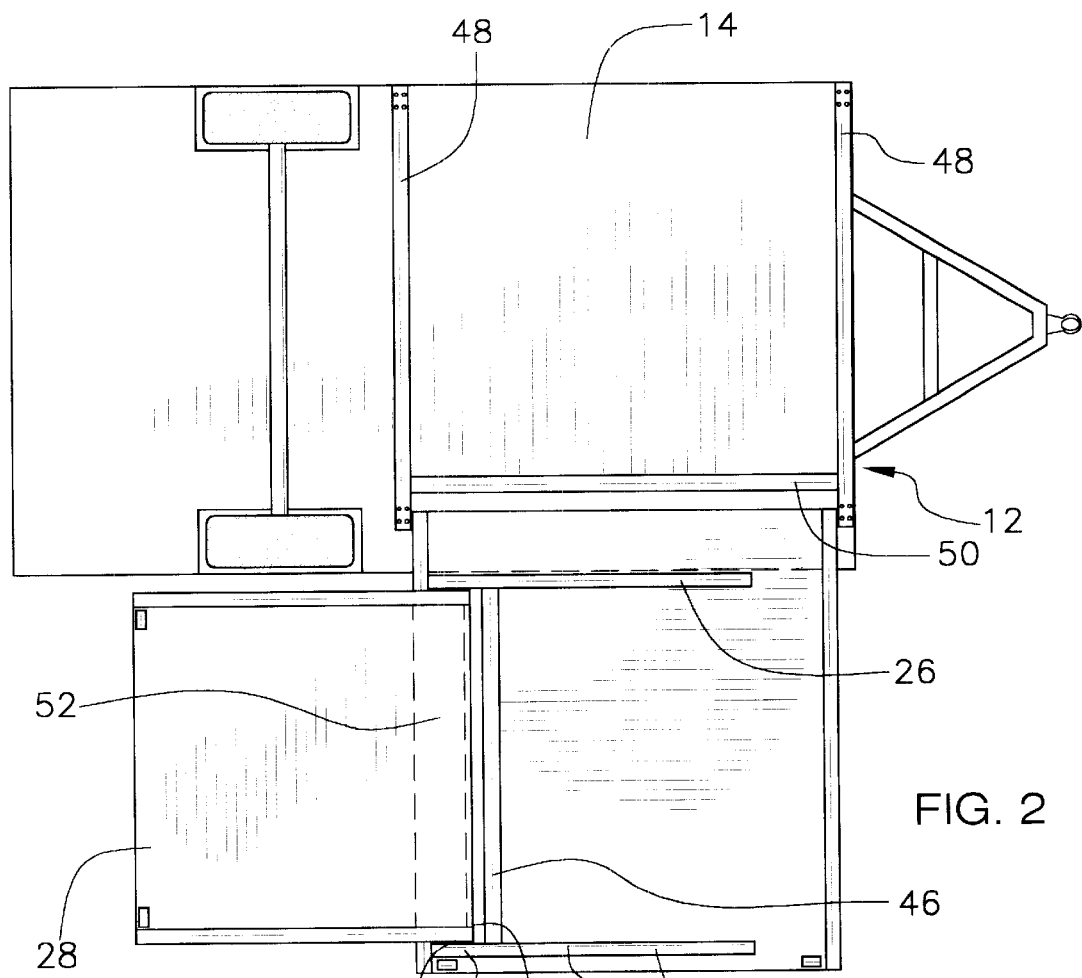
FIG. 2 is a bottom view of the present invention.
Figure 3:
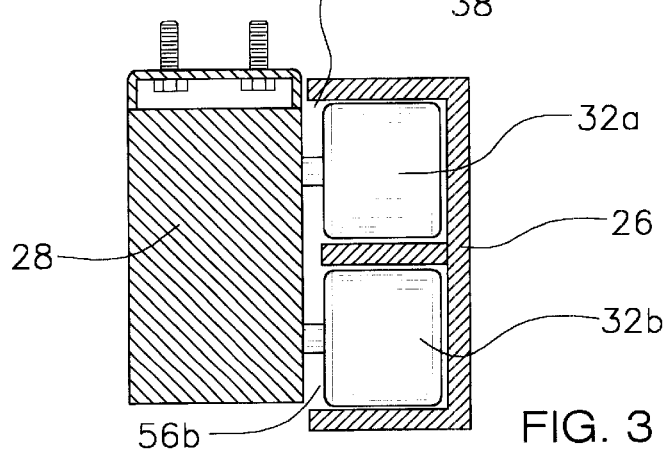
FIG. 3 is a cross-sectional view of the present invention.
Figure 4:
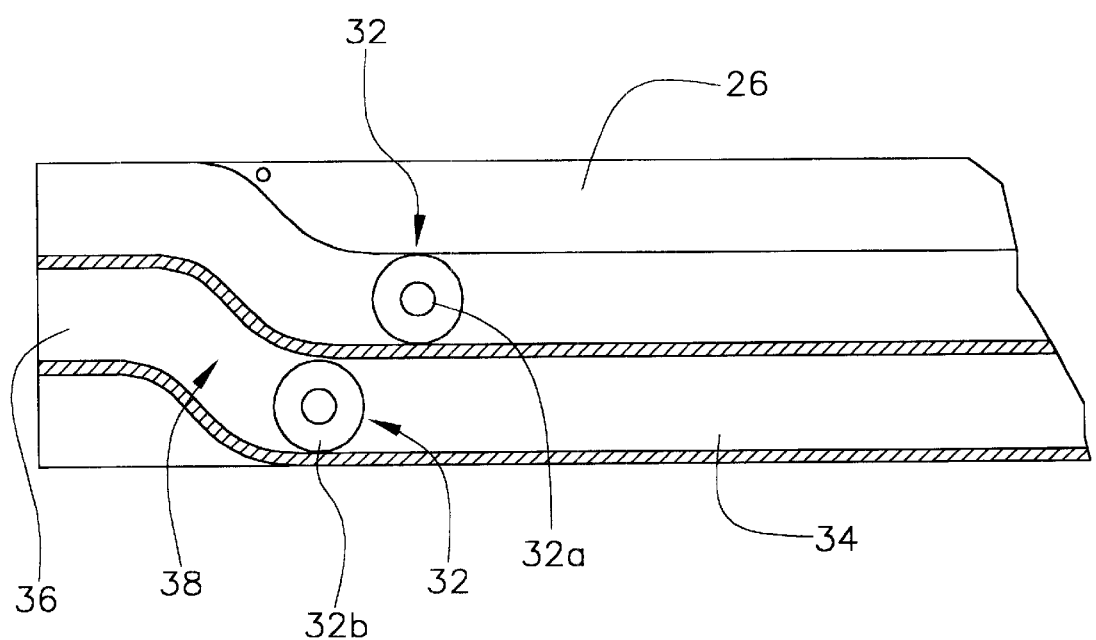
FIG. 4 is a cross-sectional view of the present invention.
Figure 5:
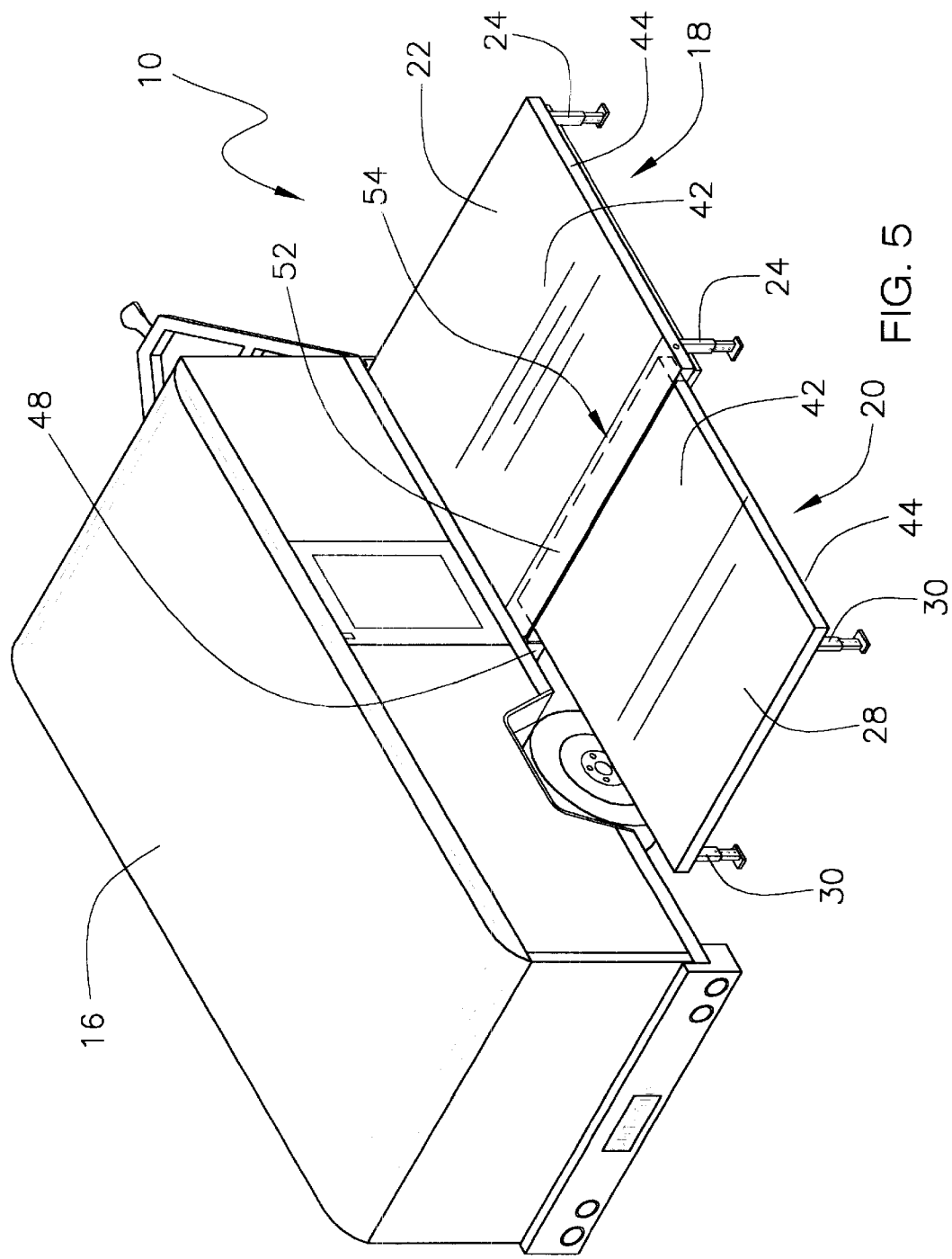
FIG. 5 is a perspective view of the invention with the second panel in a fully extended position.

With reference now to the drawings, and in particular to FIGS. 1 through 5 thereof, a new extendable deck assembly embodying the principles and concepts of the present invention and generally designated by the reference numeral 10 will be described.

As best illustrated in FIGS. 1 through 5, the extendable deck assembly 10 generally comprises a frame 12 adapted for coupling to an underside 14 of the trailer 16. A first panel assembly 18 is slidably coupled to the frame 12. A second panel assembly 20 is slidably coupled to the first panel assembly 18. The first panel assembly 18 slides outwardly from the trailer 16 in a first direction and the second panel assembly 20 slides outwardly from the first panel assembly 18 in a second direction orthogonal to the first direction whereby the first 18 and second 20 panel assemblies form a deck extending along a side of the trailer 16.

The first panel assembly 18 includes a first panel 22, an extendable first panel support leg 24, and a pair of spaced rails 26 that extend downwardly from a bottom of the first panel 22. The second panel assembly 20 includes a second panel 28, an extendable second panel support leg 30 and a pair of rollers 32. Each of the rollers 32 extends from an associated side of the second panel 28, each of the rollers 32 is positioned in an associated one of the pair of spaced rails 26.

The pair of spaced rails 26 form a first straight track portion 34. A second straight track portion 36, and an offset track portion 38 join the first 34 and second 36 track portions. The rollers 32 are positioned adjacent to a proximal end 40 of the second panel 28. The first straight track portion 34 is positioned below the first panel 22 such that the second panel 28 is positioned beneath the first panel 22 when the second panel 28 assembly is in a retracted position. The second straight track portion 36 is positioned higher than the first straight track portion 34 and extends outwardly from an end of the first panel assembly 18 such that a top surface 42 of the second panel 28 is substantially coplanar to a top surface 42 of the first panel 22 when the second panel assembly 20 is in a fully extended position.

The first panel support leg 24 is one of a pair of spaced first panel support legs. Each of the first panel support legs 24 are coupled to the first panel 22 proximate a distal edge 44 of the first panel 22 for supporting the distal edge 44 of the first panel 22 when the first panel assembly 18 is in a fully extended position. The second panel support leg 30 is one of a pair of spaced second panel support legs 30. Each of the second panel support legs 30 are coupled to the second panel 28 proximate a distal edge 44 of the second panel 28 for supporting the distal edge 44 of the second panel 28 when the second panel assembly 20 is in a fully extended position.

The first panel assembly 18 includes a second panel support bar 46 that extends between the spaced rails 26 for supporting the second panel 28 when the second panel support leg 30 is in a retracted position.

The frame 12 includes a pair of connection rails 48, the first panel assembly 18 is slidably coupled to the connection rails 48. The frame 12 includes a first panel support bar 50 that extends between the connection rails 48 for supporting the first panel 22 when the first panel support leg 24 is in a retracted position.

A deck plate 52 is pivotally coupled to the first panel 22 to cover a gap 54 between the first 22 and second 28 panels when the second panel assembly 20 is in the fully extended position.

In an embodiment, the spaced rails 26 form a pair of vertically aligned guides 56. Rollers 32 are a first pair of rollers 32A positioned in an upper one of said vertically aligned guides 56A. A second pair of rollers 32B are provided. Each roller 32B extends from an associated side of the second panel 28 and are positioned in a lower one of said vertically aligned guides 32B.

In use, the present invention would be released and pulled outward to full extension at the side. Support legs would be lowered and adjusted at the left and right outer corners of the deck to provide solid support for the elevated platform and for leveling the unit on uneven ground. Next the user would pull out the extension deck and repeat the leveling process with a secondary set of supports. This secondary deck section is designed to pull rearward alongside the parked camper, adjacent to the wheels.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An extendable deck assembly for a trailer, the deck assembly comprising:
    a frame adapted for coupling to an underside of the trailer;
    a first panel assembly slidably coupled to said frame;
    a second panel assembly slidably coupled to said first panel assembly; and
    wherein said first panel assembly slides outwardly from the trailer in a first direction and said second panel assembly slides outwardly from said first panel assembly in a second direction orthogonal to said first direction whereby said first and second panel assemblies form a deck extending along a side of the trailer.

2. The extendable deck assembly of claim 1, further comprising:
    said first panel assembly including a first panel, an extendable first panel support leg, and a pair of spaced rails extending downwardly from a bottom of said first panel;
    said second panel assembly including a second panel, an extendable second panel support leg and a pair of rollers, each of said rollers extending from an associated side of said second panel, each of said rollers being positioned in an associated one of said pair of spaced rails.

3. The extendable deck assembly of claim 2, further comprising:
    said pair of spaced rails forming a first straight track portion, a second straight track portion, and an offset track portion joining said first and second track portions;
    said rollers being positioned adjacent to a proximal end of said second panel;
    said first straight track portion being positioned below said first panel such that said second panel is positioned beneath said first panel when said second panel assembly is in a retracted position, said second straight track portion being positioned higher than said first straight track portion and extending outwardly from an end of said first panel assembly such that a top surface of said second panel is substantially coplanar to a top surface of said first panel when said second panel assembly is in a fully extended position.

4. The extendable deck assembly of claim 2, further comprising:
    said first panel support leg being one of a pair of spaced first panel support legs, each of said first panel support legs being coupled to said first panel proximate a distal edge of said first panel for supporting said distal edge of said first panel when said first panel assembly is in a fully extended position.

5. The extendable deck assembly of claim 2, further comprising:
    said second panel support leg being one of a pair of spaced second panel support legs, each of said second panel support legs being coupled to said second panel proximate a distal edge of said second panel for supporting said distal edge of said second panel when said second panel assembly is in a fully extended position.

6. The extendable deck assembly of claim 5, further comprising:
    said first panel assembly including a second panel support bar extending between said spaced rails for supporting said second panel when said second panel support leg is in a retracted position.

7. The extendable deck assembly of claim 4, further comprising:
    said frame including a pair of connection rails, said first panel assembly being slidably coupled to said connection rails; and
    said frame including a first panel support bar extending between said connection rails for supporting said first panel when said first panel support leg is in a retracted position.

8. The extendable deck assembly of claim 3, further comprising:
    a deck plate pivotally coupled to said first panel to cover a gap between said first and second panels when said second panel assembly is in said fully extended position.

9. An extendable deck assembly for a trailer, the deck assembly comprising:
    a frame adapted for coupling to an underside of the trailer;
    a first panel assembly slidably coupled to said frame;
    a second panel assembly slidably coupled to said first panel assembly;
    wherein said first panel assembly slides outwardly from the trailer in a first direction and said second panel assembly slides outwardly from said first panel assembly in a second direction orthogonal to said first direction whereby said first and second panel assemblies form a deck extending along a side of the trailer;

said first panel assembly including a first panel, an extendable first panel support leg, and a pair of spaced rails extending downwardly from a bottom of said first panel;

said second panel assembly including a second panel, an extendable second panel support leg and a pair of rollers, each of said rollers extending from an associated side of said second panel, each of said rollers being positioned in an associated one of said pair of spaced rails;

said pair of spaced rails forming a first straight track portion, a second straight track portion, and an offset track portion joining said first and second track portions;

said rollers being positioned adjacent to a proximal end of said second panel;

said first straight track portion being positioned below said first panel such that said second panel is positioned beneath said first panel when said second panel assembly is in a retracted position, said second straight track portion being positioned higher than said first straight track portion and extending outwardly from an end of said first panel assembly such that a top surface of said second panel is substantially coplanar to a top surface of said first panel when said second panel assembly is in a fully extended position;

said first panel support leg being one of a pair of spaced first panel support legs, each of said first panel support legs being coupled to said first panel proximate a distal edge of said first panel for supporting said distal edge of said first panel when said first panel assembly is in a fully extended position;

said second panel support leg being one of a pair of spaced second panel support legs, each of said second panel support legs being coupled to said second panel proximate a distal edge of said second panel for supporting said distal edge of said second panel when said second panel assembly is in a fully extended position;

said first panel assembly including a second panel support bar extending between said spaced rails for supporting said second panel when said second panel support leg is in a retracted position;

said frame including a pair of connection rails, said first panel assembly being slidably coupled to said connection rails; and said frame including a first panel support bar extending between said connection rails for supporting said first panel when said first panel support leg is in a retracted position;

a deck plate pivotally coupled to said first panel to cover a gap between said first and second panels when said second panel assembly is in said fully extended position.

10. The extendable deck assembly of claim 9, further comprising:

each of said spaced rails forming a pair of vertically aligned guides;

said pair of rollers being a first pair of rollers, each of said first pair of rollers being positioned in an upper one of said vertically aligned guides of said associated one of said rails;

a second pair of rollers, each of said second pair of rollers extending from an associated side of said second panel and being positioned in a lower one of said vertically aligned guides of said associated one of said rails.

11. The extendable deck assembly of claim 10, further comprising:

said first and second pair of rollers being vertically offset from each other to facilitate movement of said first and second pair of rollers through said offset track portion.

* * * * *